US010013212B2

United States Patent
Zheng et al.

(10) Patent No.: US 10,013,212 B2
(45) Date of Patent: Jul. 3, 2018

(54) SYSTEM ARCHITECTURE WITH MEMORY CHANNEL DRAM FPGA MODULE

(71) Applicants: Hongzhong Zheng, Sunnyvale, CA (US); Mu-Tien Chang, San Jose, CA (US)

(72) Inventors: Hongzhong Zheng, Sunnyvale, CA (US); Mu-Tien Chang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 192 days.

(21) Appl. No.: 15/086,010

(22) Filed: Mar. 30, 2016

(65) Prior Publication Data

US 2017/0153854 A1    Jun. 1, 2017

Related U.S. Application Data

(60) Provisional application No. 62/261,306, filed on Nov. 30, 2015.

(51) Int. Cl.
| | |
|---|---|
| *G06F 3/06* | (2006.01) |
| *G06F 12/08* | (2016.01) |
| *G06F 12/10* | (2016.01) |
| *G06F 9/455* | (2018.01) |

(Continued)

(52) U.S. Cl.
CPC .......... *G06F 3/0665* (2013.01); *G06F 3/0613* (2013.01); *G06F 3/0689* (2013.01); *G06F 9/45558* (2013.01); *G06F 12/0802* (2013.01); *G06F 12/1009* (2013.01);

(Continued)

(58) Field of Classification Search
CPC .... G06F 3/0613; G06F 3/0665; G06F 3/0689; G06F 3/45558; G06F 12/0802; G06F 12/1009; G06F 2209/45583; G06F 2212/1024; G06F 2212/152; G06F 2212/621

See application file for complete search history.

(56) References Cited

U.S. PATENT DOCUMENTS 8,811,065 B2    8/2014  Rajan et al.
8,880,809 B2    11/2014 Loh (Continued)

OTHER PUBLICATIONS

Park, Joonseok et al., "Synthesis and Estimation of Memory Interfaces for FPGA-based Reconfigurable Computing Engines", 11th Annual Symposium, FCCM, 2003, pp. 297-299.

*Primary Examiner* — Aracelis Ruiz
(74) *Attorney, Agent, or Firm* — Renaissance IP Law Group LLP

(57) ABSTRACT

An accelerator controller comprises a detector and a loader. The detector detects runtime features of an application or a virtual machine and identifies an accelerator logic associated with the application or the virtual machine corresponding to the detected runtime features. The loader loads the identified accelerator logic into at least one dynamic random access memory (DRAM). The at least one DRAM array is selectively reconfigurable to behave like a look-up table (LUT) or to behave like a DRAM memory array based on the identified accelerator logic, and the at least one DRAM array is in a cache-coherent address space of the operating system environment. The accelerator logic may comprise a look-up table (LUT).

20 Claims, 7 Drawing Sheets

(51) Int. Cl.
*G06F 12/0802* (2016.01)
*G06F 12/1009* (2016.01)

(52) U.S. Cl.
CPC .............. *G06F 2009/45583* (2013.01); *G06F 2212/1024* (2013.01); *G06F 2212/152* (2013.01); *G06F 2212/621* (2013.01)

(56) References Cited

U.S. PATENT DOCUMENTS

| | | | | |
|---|---|---|---|---|
| 2011/0010721 | A1* | 1/2011 | Gupta | G06F 9/5077 718/103 |
| 2011/0307233 | A1 | 12/2011 | Tseng et al. | |
| 2014/0359219 | A1* | 12/2014 | Evans | G06F 12/0802 711/118 |

* cited by examiner

SYSTEM ARCHITECTURE WITH MEMORY CHANNEL DRAM FPGA MODULE

CROSS-REFERENCE TO RELATED APPLICATION

This patent application claims the priority benefit under 35 U.S.C. § 119(e) of U.S. Provisional Patent Application No. 62/261,306 filed on Nov. 30, 2015, the disclosure of which is incorporated herein by reference in its entirety.

TECHNICAL FIELD

The present disclosure relates to computing technology. More particularly, the present disclosure relates to reconfigurable processing units and systems utilizing reconfigurable processing units.

BACKGROUND

A conventional processing accelerator may be implemented as a programmable logic device (PLD), such as a Field Programmable Gate Array (FPGA) or a Graphics Processing Unit (GPU), to provide efficient accelerator logic. Data-center and mobile-device applications are increasingly data-intensive and for such an application that utilizes a processing accelerator, a conventional memory hierarchy is unable to provide good performance and energy efficiency. The maximum efficiency of a processing accelerator in a conventional memory hierarchy is degraded by off-chip (i.e., non-CPU) memory accesses. Implementing accelerator logic close to memory to improve efficiency has thus far provided limited success because of high costs and sub-optimal performance. Further, if the accelerator logic is implemented close to memory, such as dynamic random access memory (DRAM), DRAM capacity is forfeited by integrating non-DRAM accelerator logic onto a DRAM semiconductor die.

Generally, a programmable logic device (PLD) is an electronic component that is used to form reconfigurable digital circuits. Unlike a logic gate or logic circuit, which generally has a fixed function, a PLD traditionally has an undefined function at the time of manufacture and either before the PLD can be used in a circuit, the PLD must be programmed, or reconfigured, to perform a desired function.

Traditionally, a PLD may include a combination of a logic device and a memory device. The memory is generally used to store a programming pattern that defines a desired function. Most of the techniques used for storing data in an integrated circuit have been adapted for use in a PLD, such as silicon anti-fuses, static random access memory (SRAM), erasable programmable read only memory (EPROM), electronically EPROM (EEPROM), non-volatile RAM, etc. Most PLDs generally include components that are programed by applying a special voltage (i.e., non-operational or high voltage) across a modified area of silicon inside the PLD that breaks or sets (depending on the technology) electrical connections and changes the layout of the electrical circuit of the PLD.

One of the most common types of PLDs is a field-programmable gate array (FPGA), which is an integrated circuit that is designed to be configured by a customer or a designer after manufacturing; hence the term "field-programmable." An FPGA includes an array of programmable logic blocks, and a hierarchy of reconfigurable interconnects that allow the blocks to be "wired together". The logic blocks of an FPGA can be configured to perform complex combinational functions, or merely simple logic gates like AND, XOR, etc.

SUMMARY

An embodiment provides an accelerator controller comprises a detector and a loader. The detector detects runtime features of an application or a virtual machine and identifies an accelerator logic associated with the application or the virtual machine corresponding to the detected runtime features. The loader loads the identified accelerator logic into at least one dynamic random access memory (DRAM). The at least one DRAM array may be selectively reconfigurable to behave like a look-up table (LUT) or to behave like a DRAM memory array based on the identified accelerator logic, and the at least one DRAM array may be in a cache-coherent address space of the operating system environment. The accelerator logic may comprise a look-up table (LUT).

Another embodiment provides an accelerator controller comprising: a detector to detect runtime features of an application or a virtual machine in which the runtime features may be based on at least one of a predefined identification of the application or the virtual machine, a function utilization, a central processing utilization, a memory utilization, a latency associated with the application or the virtual machine; and a loader to load an accelerator logic corresponding to the detected runtime features into at least one dynamic random access memory (DRAM) in which the at least one DRAM array may be selectively reconfigurable to behave like a look-up table (LUT) or to behave like a DRAM memory array based on the identified accelerator logic. The the detector may be further to identify an accelerator logic associated with the application or the virtual machine corresponding to the detected runtime features, and the at least one DRAM array may be in a cache-coherent address space of the system. In one embodiment, the accelerator logic may comprise a look-up table (LUT). In another embodiment, the DRAM array may be part of a Dual In-line Memory Module (DIMM).

Yet another embodiment provides a method, comprising detecting runtime features of an application or a virtual machine running in an operating system environment; selecting an accelerator logic corresponding to the detected runtime features; and storing the selected accelerator logic in at least one dynamic random access memory (DRAM) sub-array using load and store commands in which the at least one DRAM sub-array may be selectively reconfigurable to behave like a look-up table (LUT) or to behave like a DRAM memory array, in which the at least one DRAM sub-array may be configured to behave like an LUT, and in which the at least one DRAM sub-array may be in a cache-coherent address space of the operating system environment.

BRIEF DESCRIPTION OF THE DRAWINGS

In the following section, the aspects of the subject matter disclosed herein will be described with reference to embodiments illustrated in the figures, in which.

DETAILED DESCRIPTION

Figure 1:
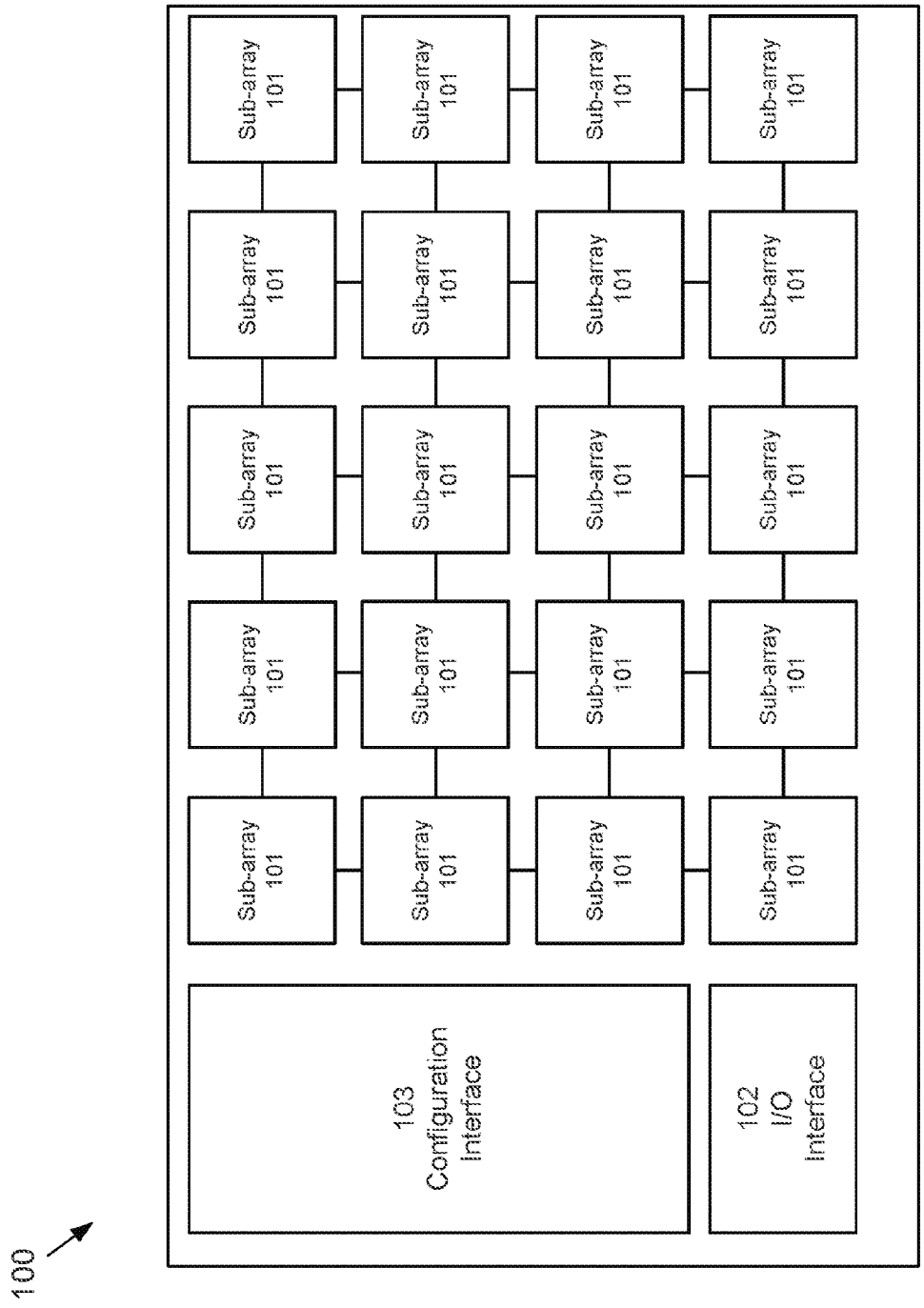
FIG. 1 depicts an embodiment of a reconfigurable memory logic device according to the subject matter disclosed herein.

The subject matter disclosed herein relates to a system architecture that utilizes one or more dynamic random access memory field programmable gate arrays (DRAM-FPGAs) in a memory channel. A DRAM-FPGA uses a selectively reconfigurable DRAM cell array as lookup table (LUT); implements reconfigurable logic close to memory; and can be reconfigured into arbitrary logic designs.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment is included in at least one embodiment disclosed herein. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

The subject matter disclosed herein relates to a DRAM-based reconfigurable logic that uses a DRAM cell array as a lookup table (LUT); implements reconfigurable logic close to memory; and can be reconfigured into arbitrary logic designs. Moreover, such a DRAM-based reconfigurable logic is compatible with DRAM fabrication processes and is a good candidate for in-memory processing. Compared to conventional Field-Programmable Gate Arrays (FPGAs), DRAM-based reconfigurable logic provides higher density, lower cost, and more flexibility (e.g., self-modifying and fast dynamic reconfiguration that supports fast migration between different compute nodes in warehouse-scale data centers).

Conventional system architectures that utilize PLDs in the form of a Field Programmable Gate Array (FPGA) typically locate the FPGA in a PCIe slot, which is not in cache-coherent address space and provides low communication bandwidth. Also, operation of accelerator logic in a FPGA in a PCIe slot is by explicit command provided by a driver.

FIG. 1 depicts an embodiment of a reconfigurable memory logic device 100 according to the subject matter disclosed herein. The reconfigurable memory logic device 100 can be configured and connected to work in either a look-up table (LUT) mode or a regular dynamic random access memory (DRAM) mode. The reconfigurable memory logic device 100 comprises one or more sub-arrays 101, an input/output (I/O) interface 102, and a configuration interface 103. The sub-arrays 101 are arranged in rows and columns. Each sub-array 101 may comprise a number of memory cells (not shown) that may also be arranged into an array of rows and columns. The reconfigurable memory logic device 100 may comprise other components and/or elements that are not depicted in FIG. 1.

In one embodiment, the sub-arrays 101 comprise dynamic read-only memory (DRAM). One or more of the sub-arrays 101 may be selectively reconfigured, or reprogrammed, using normal memory access operations to behave like a look-up table (LUT) or, alternatively, to behave like a traditional DRAM sub-array. As used herein, reconfigurable memory logic device 100 may generally be referred to herein as an FPGA. For embodiments of reconfigurable memory logic device 100 in which the sub-arrays 101 comprise DRAM, reconfigurable memory logic device 100 may be referred to herein as a "DRAM-FPGA."

In one embodiment, the number of sub-arrays 101 that are configured to be LUTs or to be RAMs may be dynamically adjusted as desired. In another embodiment, one or more of the sub-arrays 101 may be reconfigurable to behave like an LUT or a traditional memory sub-array, while one or more of the sub-arrays 101 may be non-reconfigurable and are configured to behave as traditional memory sub-arrays. As used herein, a sub-array that is reconfigurable to behave like an LUT or behave like a traditional memory sub-array is referred to as a reconfigurable LUT (RLUT) sub-array.

If a sub-array 101 is configured to behave like an LUT, the LUT behavior may implement a logic function, such as, but not limited to, an arithmetic logic function (i.e., adder, multiplier, etc.), a logical function (AND, OR, XOR, etc.), or a combination thereof. The logic function may be altered by merely performing a memory write operation or a special write operation on the sub-array, thereby allowing logic functions to be dynamically reconfigured or altered during operation of the reconfigurable memory logic device 100. A special write operation may include an indicator that the write operation involves a particular sub-array. Use of a traditional write operation (or similar) may allow for reprogramming of a selected sub-array 101 without the need of a special (i.e., non-operational or high) voltage, such as those used for programming EEPROMs, etc.

Co-mingling of RLUT sub-arrays and RAM sub-arrays may provide advantages. For example, the close proximity to the data stored in a RAM sub-array may speed the computation performed by an RLUT sub-array and lower the power requirements because data need not be moved across busses between individual components. Additionally, in one embodiment, one or more of the sub-arrays 101 may be accessed at a time, thereby reducing power and computation complexity of the reconfigurable memory logic device 100. As such, the near-data computing provided by a DRAM RLUT may be faster and more efficient. By basing an RLUT sub-array upon DRAM-technology similar to that used to create a processor (not shown) and memory (not shown), an RLUT sub-array may exist within the same die or package as a processor and/or a memory. Using the same manufacturing process may lower the cost of the production of a system utilizing one or more RLUTs in a memory channel according to the subject matter disclosed herein. Further, basing the RLUT sub-arrays on DRAM subarrays, a higher density may be achieved in comparison to the density of an SRAM-based FPGA. For example, a DRAM-based RLUT may require only one transistor and one capacitor (1T1C) per memory cell or bit of information, whereas an SRAM-based FPGA may require six transistors (6T) per memory cell or bit of information. Additionally, a DRAM-based RLUT may result in a lower cost in comparison to SRAM- or Flash-based FPGAs.

The I/O interface 102 may be configured to read or write to a selected sub-array 101. The write access may involve writing to the sub-array 101 to define whether the sub-array behaves as an LUT or behaves as a traditional DRAM sub-array. In some embodiments, all memory accesses or operations may pass through the I/O interface 102. If the memory access is to a sub-array that stores data for revival either a RAM sub-array or an RLUT sub-array configured as a RAM sub-array, the I/O interface 102 may simply process the read/write request as a traditional memory access. If, however, the memory access is to an RLUT sub-array that is configured as an LUT, the I/O interface 102 may pass the memory access to the configuration interface 103 for processing.

The configuration interface 103 may be configured to adjust the routing of signals within the reconfigurable memory logic device 100 as a whole and/or within each respective RLUT sub-array 101. For example, the configuration interface 103 may be configured to adjust the routing of signals between multiple sub-arrays configured as RLUTs and/or as RAMs. In one example embodiment, the I/O interface 102 may be configured to manage data access to the sub-arrays 101. For example, in one embodiment, the I/O interface 102 may receive configuration information from a processor (not shown), that is used to configure the I/O interface 102 to control I/O access to the sub-arrays 102 so that memory locations in the sub-arrays appear as addressable registers. The configuration interface 103 may be configured to manage the interconnects and signal routing between the respective sub-arrays 101 by, for example, point-to-point routing, address-based routing, or a combination thereof. For example, in one embodiment, configuration information may be received by the I/O interface 102 that is used to configure the configuration interface 103 so that sub-arrays 101 may perform complex logical operation that may span multiple sub-arrays 101. In one example embodiment, the I/O interface 102 may include the configuration interface 103.

A memory access may include a write operation that stores a look-up table in a particular RLUT sub-array 101. The memory access may also include a series of memory accesses depending upon the size of the LUT. In some embodiments, particular memory accesses may indicate the number of inputs to the LUT and the number of outputs from the LUT. Additionally, further memory accesses may indicate signal routing information regarding the RLUT sub-array 101 and/or whether two or more RLUT sub-arrays are cascaded or otherwise routed together to perform logical functions (e.g., an adder, etc.). Details of logic functions that may be provided by a sub-array 101 are set forth in U.S. patent application Ser. No. 14/814,503, entitled "DRAM-Based Reconfigurable Logic," the disclosure of which is incorporated by reference herein. A memory access may alternatively include a write operation that reconfigures an RLUT sub-array 101 to behave as a traditional RAM sub-array.

Figure 2:
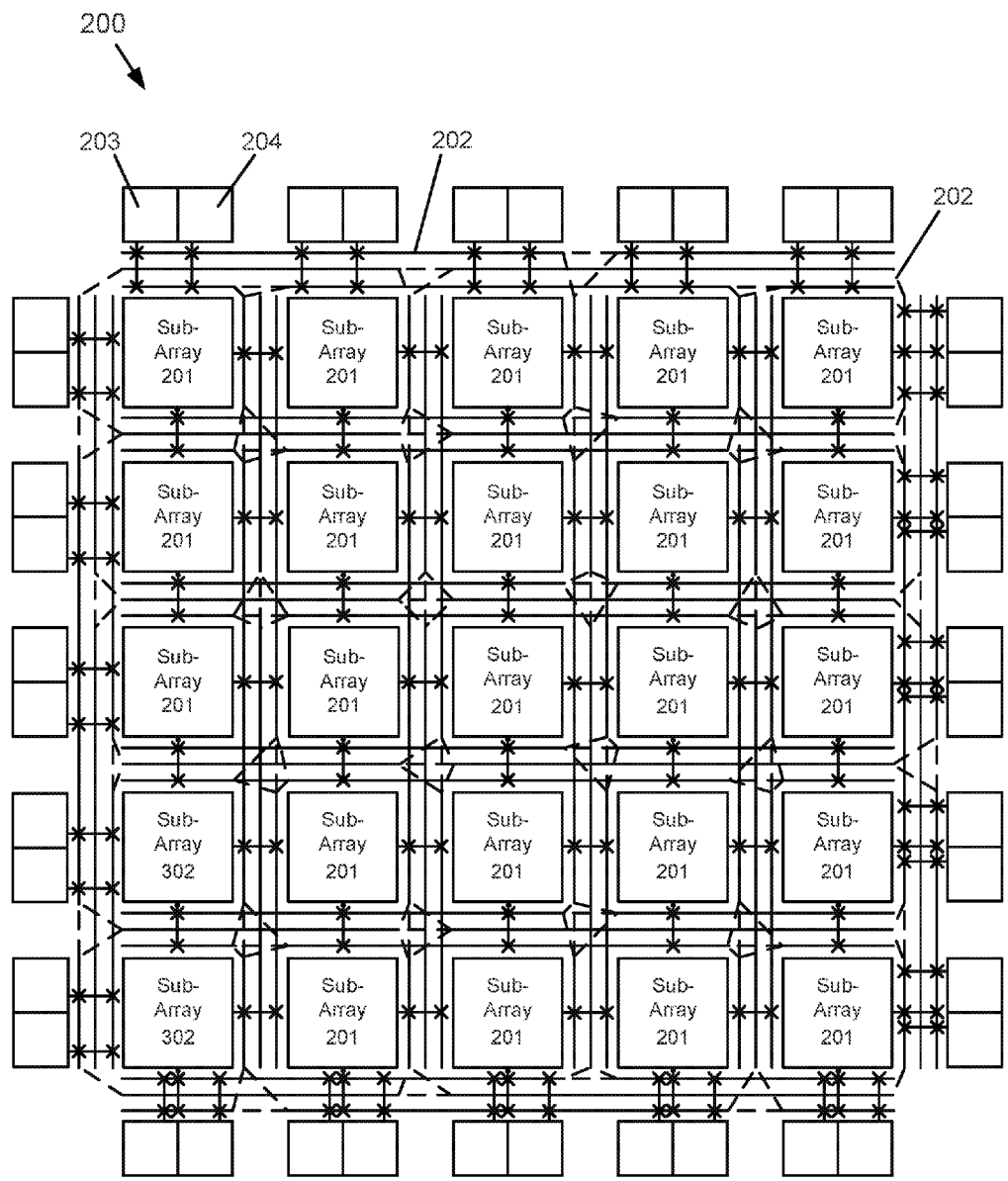
FIG. 2 depicts a block diagram of another embodiment of the reconfigurable memory logic in accordance with the subject matter disclosed herein.

FIG. 2 depicts a block diagram of another example embodiment of the reconfigurable memory logic 200 in accordance with the subject matter disclosed herein. As depicted in FIG. 2, the reconfigurable memory logic 200 may be embodied on a separate die or a portion of a die in which the reconfigurable memory logic 200 may be integrated with other components (not shown) on a shared die, such as, but not limited to, a system-on-a-chip, a processor cache, etc. The reconfigurable memory logic 200 comprises one or more sub-arrays 201, a plurality of communication buses 202, input signal pads 203 and output signal pads 204. The reconfigurable memory logic 200 may be implemented with a bus-based interconnection and routing scheme. The communications bus 202 may allow the routing scheme between the sub-arrays 201 to be dynamically altered to re-route signals between the sub-arrays 201.

If a sub-array 201 is configured to behave like an LUT, the LUT behavior may implement a logic function, such as, but not limited to, an arithmetic logic function (i.e., adder, multiplier, etc.), a logical function (AND, OR, XOR, etc.), or a combination thereof. Details of logic functions that may be provided by a sub-array 201 are set forth in U.S. patent application Ser. No. 14/814,503, entitled "DRAM-Based Reconfigurable Logic," the disclosure of which is incorporated by reference herein. The logic function may be altered by merely performing a memory write operation or a special write operation on the sub-array, thereby allowing logic functions to be dynamically reconfigured or altered during operation of the reconfigurable memory logic device 200. A special write operation may include an indicator that the write operation involves a particular sub-array.

According to an example embodiment, one or more sub-arrays 101 of FIG. 1 and or one or more reconfigurable memory logic 200 of FIG. 2 may be used in a Dual In-line Memory Module (DIMM). That is, a DIMM may be configured to include one or more DRAM-FPGA modules, one or more RLUT modules, a combination of one or more DRAM-FPGA modules and one or more RLUT modules, or a combination of one or more DRAM-FPGA modules and/or one or more RLUT modules in combination with one or more regular DRAM modules. FIGS. 3A-3D respectively depict example embodiments of DIMMs comprising one or more DRAM-FPGAs according to the subject matter disclosed herein.

Figure 3A:
FIGS. 3A-3D respectively depict embodiments of DIMMs comprising one or more DRAM-FPGAs according to the subject matter disclosed herein.
Figure 3A:
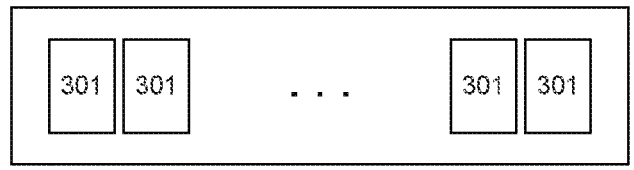

In FIG. 3A, a DIMM 300 comprises a plurality of DRAM-FPGA modules 301, of which only four DRAM- FPGA modules 301 are shown. Thus, for the particular example embodiment of DIMM 300, all of the module positions are occupied by DRAM-FPGA modules 301. Alternatively, all of the module positions may be occupied by RLUT modules in which each RLUT module comprises only reconfigurable look-up tables (RLUTs).

Figure 3B:
Figure 3B:
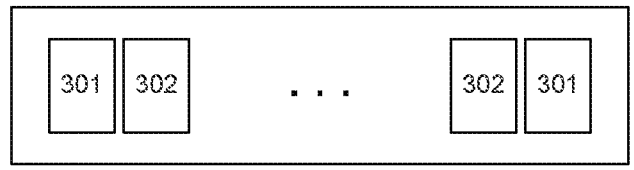

In FIG. 3B, a DIMM 310 comprises one or more DRAM-FPGAs modules 301, of which two are shown, and one or more regular DRAM modules 302, of which two are shown. For the particular example embodiment of DIMM 310, the physical arrangement of the DRAM-FPGAs modules 301 and the regular DRAM modules 302 may be in any order. Alternatively, the configuration of DIMM 310 may one or more RLUT modules and one or more regular DRAM modules 302.

Figure 3C:
Figure 3C:
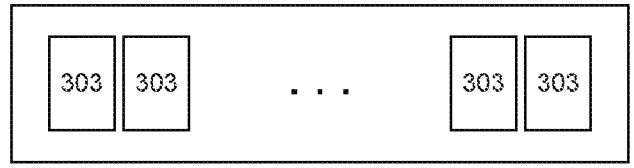

In FIG. 3C, a DIMM 320 comprises a plurality of hybrid DRAM-FPGA modules 303, of which only four hybrid DRAM-FPGAs modules 303 are shown. A hybrid DRAM-FPGA module 303 comprises one or more sub-arrays that are reconfigurable to behave like a look-up table (LUT) or to behave like a traditional DRAM sub-array, and one or more sub-arrays that are non-reconfigurable and behave like a traditional DRAM sub-array. That is, the configuration of DIMM 320 includes only hybrid DRAM-FPGA modules 303.

Figure 3D:
Figure 3D:
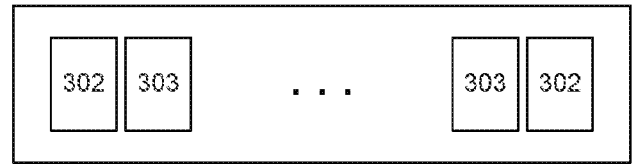

In FIG. 3D, a DIMM 330 comprises one or more hybrid DRAM-FPGA modules 303, of which two are shown, and one or more regular DRAM modules 302, of which two are shown. For the particular example embodiment of DIMM 330, the physical arrangement of the hybrid DRAM-FPGAs modules 303 and the regular DRAM modules 302 may be in any order.

It should be understood that other DIMM configurations are possible, such as, but not limited to a DIMM configuration comprising one or more DRAM-FPGA modules, one or more regular DRAM modules, one or more hybrid DRAM-FPGA modules and/or one or more RLUT modules.

Figure 4:
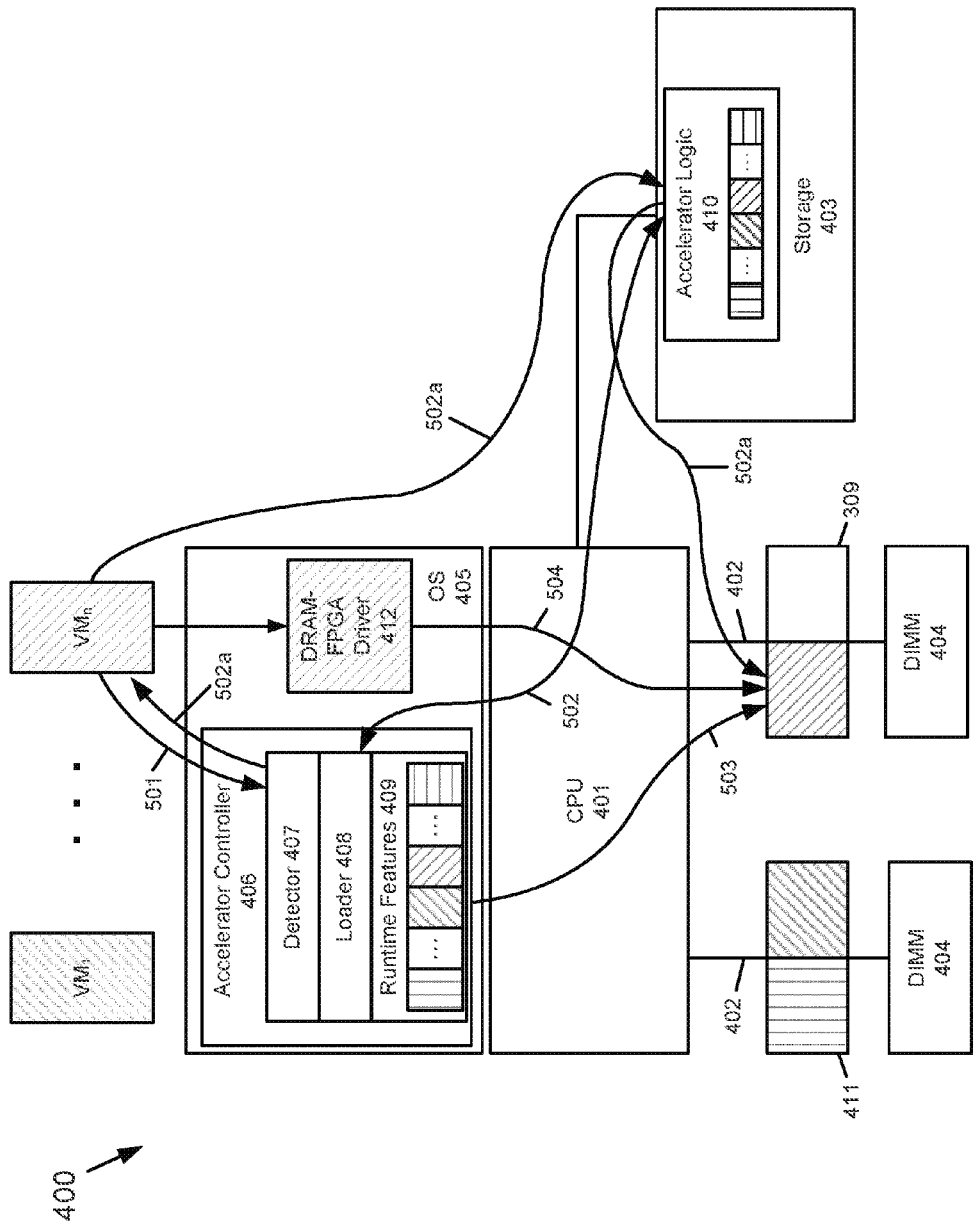
FIG. 4 depicts a functional block diagram of an embodiment of a system architecture that utilizes one or more DRAM-FPGAs in a memory channel according to the subject matter disclosed herein.
Figure 5:
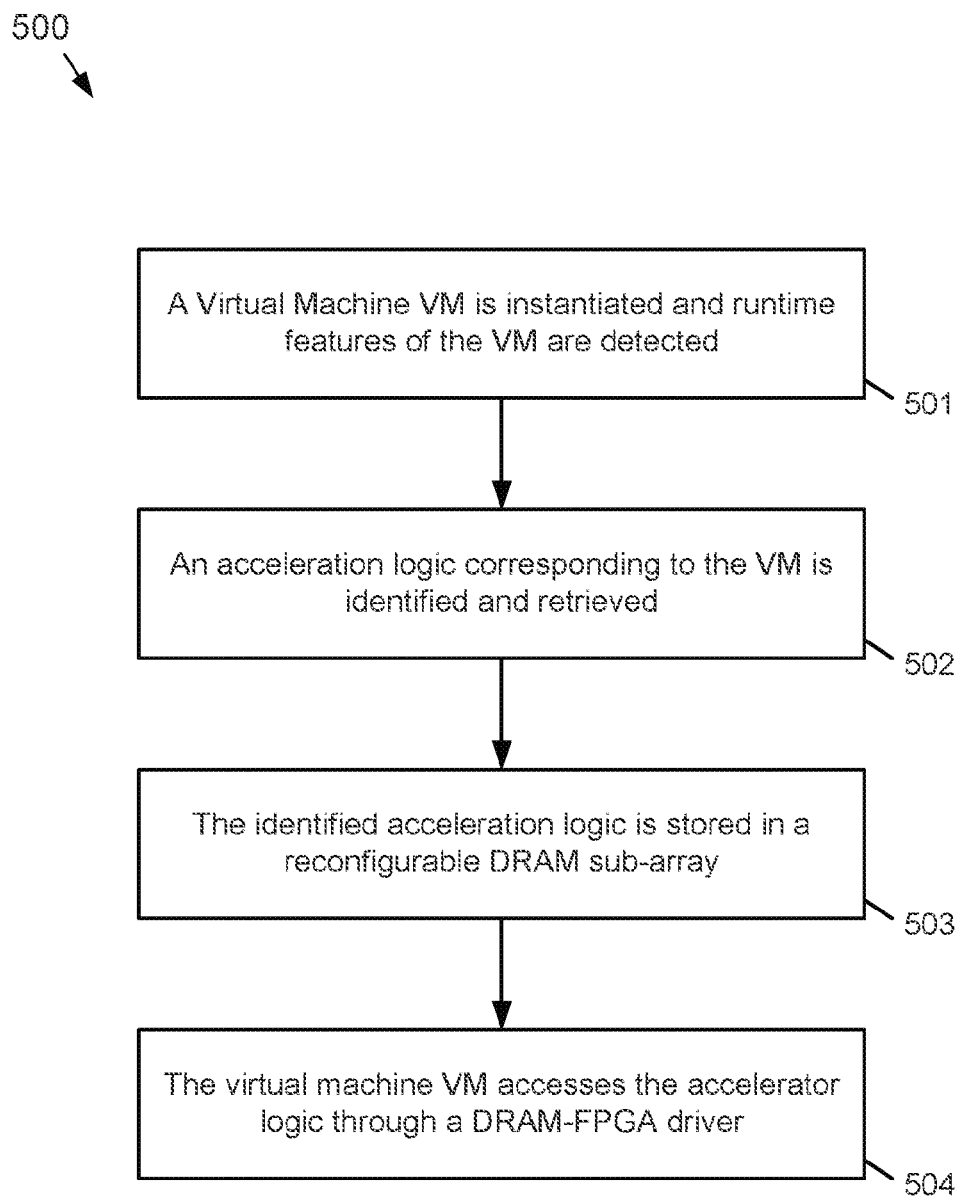
FIG. 5 depicts a flow diagram of a method to detect runtime features of a virtual machine or an application and store acceleration logic corresponding to the virtual machine or application in a reconfigurable DRAM sub-array according to the subject matter disclosed herein.

FIG. 4 depicts a functional block diagram of an example embodiment of a system architecture 400 that utilizes one or more DRAM-FPGAs in a memory channel according to the subject matter disclosed herein. FIG. 5 depicts a flow diagram of a method 500 to detect runtime features of a virtual machine or an application and store acceleration logic corresponding to the virtual machine or application in a reconfigurable DRAM sub-array according to the subject matter disclosed herein. Operations 501-504 of method 500 that indicated in FIG. 4 are discussed later in connection with FIG. 5.

Referring to FIG. 4, the system architecture 400 comprises a central processing unit (CPU) 401 coupled to system memory, such as random access memory (RAM) through a memory channel 402 and to one or more mass storage devices 403. The RAM of the system memory may include static RAM (SRAM) and/or dynamic RAM (DRAM). In one example embodiment, the system memory comprises DRAM in one or more dual in-line memory modules (DIMMs) 404, as depicted in FIG. 4. In one embodiment, the DIMMs 404 may be configured to include one or more DRAM-FPGA modules, one or more RLUT modules, a combination of one or more DRAM-FPGA modules and one or more RLUT modules, or a combination of one or more DRAM-FPGA modules and/or one or more RLUT modules in combination with one or more regular DRAM modules. DRAM-FPGAs in the memory channel are embodied in one or more DIMMs.

An operating system (OS) 405 runs on CPU 401. The operating system 405 may be, but is not limited to, a Unix-based operating system, a Unix-like operating system, Linux-based operating system, a Chrome-based operating system or a windows-based operating system. One or more virtual machines (VM) may be running on the operating system 405. As depicted in FIG. 4, $VM_1$-$VM_n$ are running on operating system 405. In a situation in which the system architecture 400 is embodied in a data-center environment, the virtual machines $VM_1$-$VM_n$ may represent data-center applications. In a situation in which the system architecture 400 is embodied in a mobile-device environment, the virtual machines $VM_1$-$VM_n$ may represent mobile-device applications.

The operating system 405 includes an accelerator controller 406 that detects the instantiation of a virtual machine VM by detecting runtime features 407 that are associated with the instantiated virtual machine VM. As used herein, the term "runtime features" of a virtual machine VM means the operating characteristics of, such as, but not limited to, an identity of the VM and/or a particular set up configuration. In one embodiment, the accelerator controller 406 may be software based, hardware based, or a combination thereof. In one embodiment, the accelerator controller 406 may comprise a software module in the operating system 405. In another embodiment, the accelerator controller 406 may comprise a hardware module in a memory controller (not shown in FIG. 4).

In one embodiment, the accelerator controller 406 includes a detector 407 and a loader 408. The detector 407 detects runtime features 409 of an application or a virtual machine and identifies an accelerator logic 410 associated with the application or the virtual machine corresponding to the detected runtime features 409. In another embodiment, the accelerator controller 406 profiles a virtual machine VM or an application at run time and collects a runtime signature, such as, but not limited to, a function utilization, a central processor unit (CPU) utilization, a latency, and/or other microarchitecture statistics, and uses the runtime signature to search a repository of accelerator logic 410. In one embodiment, the runtime features 409 that are used to detect the runtime features of a virtual machine VM or an application may be stored in the accelerator controller 406 or may be part of accelerator controller 406. In another embodiment, the runtime features 409 may be stored in, for example, a storage 403 and loaded into the accelerator logic 406 at the time the accelerator controller 406 is initialized.

Based on the detected runtime features 409 of a virtual machine VM (or an application), the accelerator controller 406 selects and loader 408 retrieves the accelerator logic 410 that may be used by the virtual machine, which may be stored in mass storage device 403, and loads the accelerator logic 410 for the virtual machine into a DRAM-FPGA 411 using memory channel store instructions. In one embodiment, the accelerator logic 410 that is retrieved may be requested by the virtual machine VM or may be optionally requested by the virtual machine VM. In another embodiment, the accelerator logic 410 may be requested or recommended by the operating system 405, or by a user. In an alternatve embodiment, the accelerator controller 406 may identify the accelerator logic 410 for the virtual machine VMn, and the virtual machine VMn retrieves and stores the accelerator logic 410 in the DRAM-FPGA 411 using memory channel store instructions. As the accelerator logic 410 is stored in the DRAM-FPGA 411, which is in the memory channel 402 of the system 400, the accelerator logic 410 is thus stored in cache-coherent address space that can be accessed directly by CPU 401. In that regard, the accelerator logic 410 is stored in a cach-coherent address space accessible by the operation system 405.

As depicted in FIG. 4, the virtual machine $VM_n$, the runtime features 409, the accelerator logic 410, the particular DRAM-FPGA 411 storing the accelerator logic 410, and the DRAM-FPGA driver 412 for the virtual machine $VM_n$ are indicated by a crosshatching that extends from the upper left to the lower right. Other virtual machines, their respective runtime features, accelerator logic and DRAM-FPGA locations are also indicated by correspondingly similar crosshatching. In one embodiment, the accelerator controller 406 communicates the address of the DRAM-FPGA driver 412 corresponding to the virtual machine VM to the virtual machine VM. As the virtual machine VM accesses the DRAM-FPGA driver 412, the DRAM-FPGA driver 412 accesses the accelerator logic 410 for the virtual machine VM, which is stored in the DRAM-FPGA 411.

Figure 6:
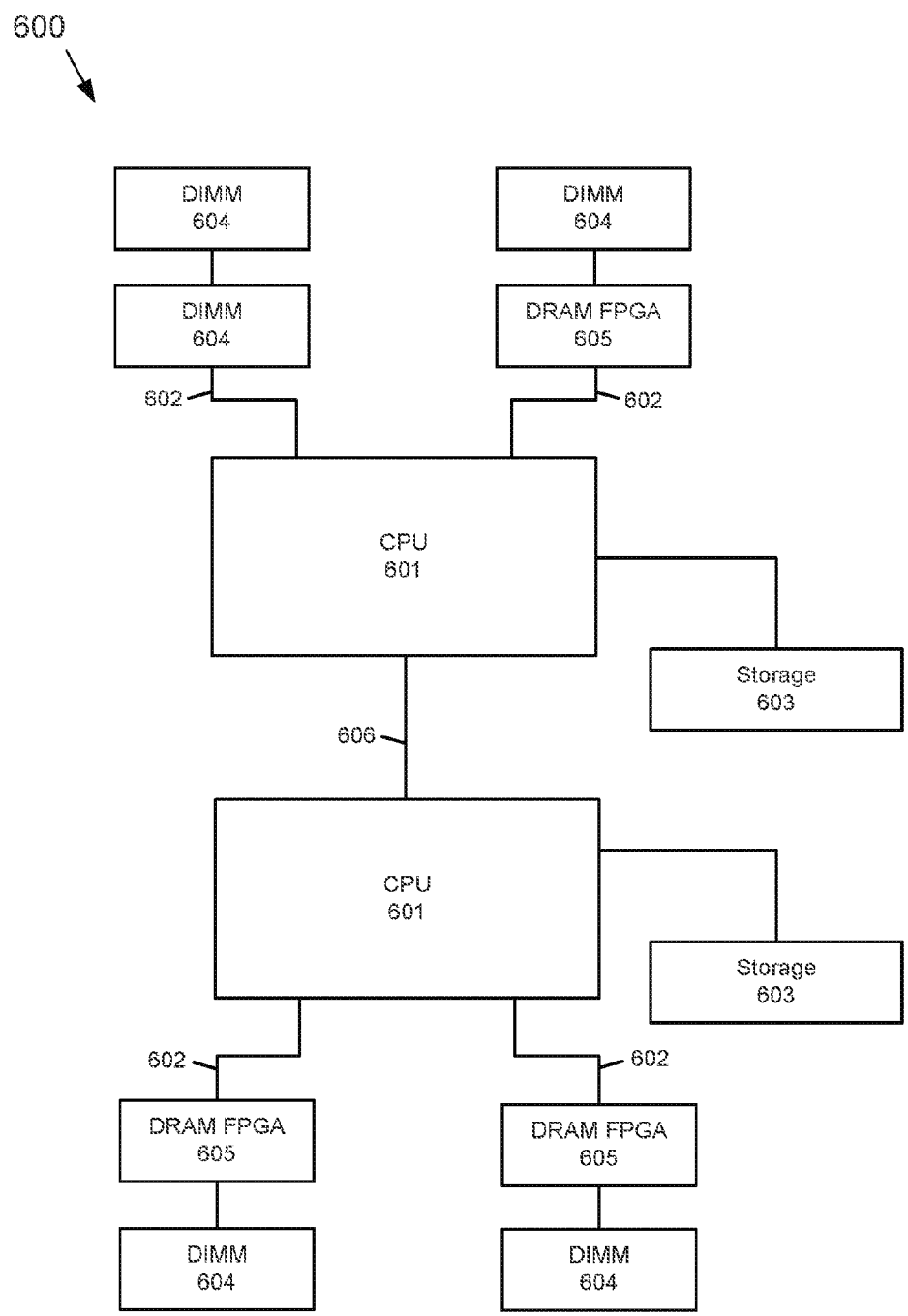
FIG. 6 depicts a system architecture that is QPI-based and that utilizes one or more DRAM-FPGAs in a memory channel according to the subject matter disclosed herein.

FIG. 5 depicts a flow diagram of a method 500 to detect runtime features of a virtual machine or an application and store acceleration logic corresponding to the virtual machine or application in a reconfigurable DRAM sub-array according to the subject matter disclosed herein. Referring to FIG. 4, consider a situation in which a virtual machine $VM_n$ is instantiated at 501 of FIG. 5. The accelerator controller 406 detects that the virtual machine $VM_n$ has been instantiated based on runtime features 409 associated with virtual machine $VM_n$. At 502, the accelerator controller 406 selects and retrieves the accelerator logic 410 for the virtual machine $VM_n$. At 503, the loader 408 of the accelerator controller 406 stores the selected accelerator logic 410 in a DRAM-FPGA 411 using memory channel store instructions. In an alternatve embodiment, the accelerator controller 406 identifies the accelerator logic 410 for the virtual machine VMn at 503, and the virtual machine VMn retrieves and stores the accelerator logic 410 in the DRAM-FPGA 411 using memory channel store instructions at 502a in FIG. 4. At 504, the virtual machine $VM_n$ accesses the accelerator logic 308 in the DRAM-FPGA 411 through a DRAM-FPGA driver 412. In another example embodiment, the system architecture 400 is applicable to a point-to-point processor interconnect environment, such as, but not limited to a QuickPath Interconnect (QPI) environment. For example, FIG. 6 depicts a system architecture 600 that is QPI-based and that utilizes one or more DRAM-FPGAs in a memory channel according to the subject matter disclosed herein. In FIG. 6, system architecture 600 comprises two CPUs 501 that are coupled to system memory, such as random access memory (RAM), through a memory channel 602, and to one or more mass storage devices 603. The RAM of the system memory may include static RAM (SRAM) and/or dynamic RAM (DRAM). In one example embodiment, the system memory comprises DRAM embodied in one or more dual in-line memory modules (DIMMs) 604. One or more DRAM-FPGAs 605 may be utilized in the memory channels 602 of the respective CPUs 601. The CPUs 601 are coupled to each other through a QPI-based interconnect 606.

Figure 7:
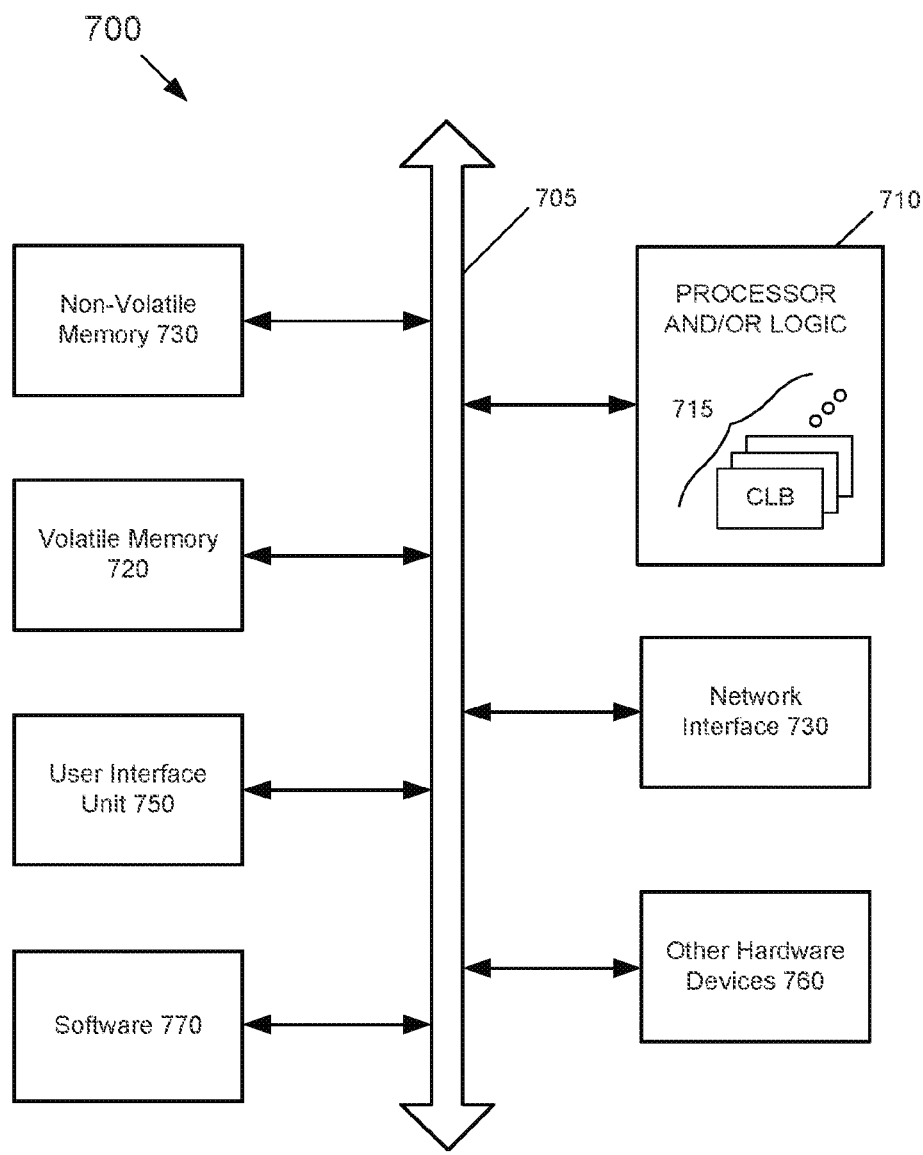
FIG. 7 depicts a functional block diagram of an embodiment of an information-processing system that may utilize a system architecture that comprises one or more DRAM-FPGAs in a memory channel according to the subject matter disclosed herein.

FIG. 7 depicts a functional block diagram of an example embodiment of an information-processing system 700 that may utilize a system architecture that comprises one or more DRAM-FPGAs in a memory channel according to the subject matter disclosed herein. The information-processing system 700 may include one or more of devices constructed according to the subject matter disclosed herein.

In various embodiments, the information-processing system 700 may be embodied as a computing device, such as, but not limited to, a laptop, desktop, workstation, server, blade server, personal digital assistant, smartphone, tablet, and other appropriate computers, etc. or a virtual machine or virtual computing device thereof. In various embodiments, the information-processing system 700 may be used by a user (not shown).

The information-processing system 700 may further comprise a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. The combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter. In some embodiments, the components comprising processor 610 may comprise components embodying an acceleration controller according to the subject matter disclosed herein.

The information-processing system 700 according to the disclosed subject matter may further include a volatile memory 720 (e.g., a Random Access Memory (RAM), etc.) that is accessible by processor 710 through a memory channel. The information-processing system 700 according to the disclosed subject matter may further include a non-volatile memory 730 (e.g., a hard drive, an optical memory, a NAND or Flash memory, etc.). In some embodiments, either the volatile memory 720, the non-volatile memory 730, or a combination or portions thereof may be referred to as a "storage medium." In various embodiments, the volatile memory 720 and/or the non-volatile memory 730 may be configured to store data in a semi-permanent or substantially permanent form.

In various embodiments, one or more reconfigurable look-up tables (RLUTs) described above may be included in the volatile memory 720 or even the non-volatile memory 730. As described above, a RLUT may be included as part of a DRAM or other memory. As described above, in some embodiments, a portion of the memory 720 or 730 may be employed to store data and a second portion may be employed as a RLUT. In some embodiments, the RLUT may also be considered part of the processor and/or logic 710. As described above, the RLUT may perform one or more logic functions, and therefore may execute instructions.

In various embodiments, the information-processing system 700 may include one or more network interfaces 740 configured to allow the information-processing system 700 to be part of and communicate via a communications network. Examples of a Wi-Fi protocol may include, but is not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc.

The information-processing system 700 according to the disclosed subject matter may further include a user interface unit 750 (e.g., a display adapter, a haptic interface, a human interface device, etc.). In various embodiments, the user interface unit 750 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information-processing system 700 may include one or more other devices or hardware components 760, such as, but not limited to a display or monitor, a keyboard, a mouse, a camera, a fingerprint reader, a video processor, etc.

The information-processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data input from outside of the non-volatile memory 730 may be stored in either the non-volatile memory 730 or the volatile memory 720.

In various embodiments, the information-processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740, etc.) of the information-processing system 700. In such an embodiment, the information-processing system 700 may include one or more native applications, which may be installed locally (e.g., within the non-volatile memory 730, etc.) and configured to be executed directly by the processor 710 and directly interact with the OS. In such an embodiment, the native applications may include pre-compiled machine-executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 710. In some embodiments, one or more of the software components 770 may comprise executable instructions embodying an acceleration controller according to the subject matter disclosed herein.

As will be recognized by those skilled in the art, the innovative concepts described herein can be modified and varied over a wide range of applications. Accordingly, the scope of claimed subject matter should not be limited to any of the specific teachings discussed above, but is instead defined by the following claims.

What is claimed is:

1. An accelerator controller, comprising:
a detector to detect runtime features of an application or a virtual machine and to identify an accelerator logic associated with the application or the virtual machine corresponding to the detected runtime features; and
a loader to load the identified accelerator logic into at least one dynamic random access memory (DRAM) array, the at least one DRAM array being selectively reconfigurable to behave like a look-up table (LUT)based on the identified accelerator logic.

2. The accelerator controller according to claim 1, further comprising the at least one DRAM.

3. The accelerator controller according to claim 1, wherein the at least one DRAM array is in a cache-coherent address space of an operating system environment.

4. The accelerator controller according to claim 1, wherein the runtime features are based on a predefined identification of the application or the virtual machine.

5. The accelerator controller according to claim 1, wherein the runtime features are based on at least one of a function utilization, a central processing utilization, a memory utilization, and a latency associated with the application or the virtual machine.

6. The accelerator controller according to claim 1, wherein the accelerator logic comprises a look-up table (LUT).

7. The accelerator controller according to claim 1, wherein the at least one DRAM array is part of a Dual In-line Memory Module (DIMM).

8. The accelerator controller according to claim 7, wherein the DIMM further comprises at least one DRAM array that is not selectively reconfigurable to behave like a look-up table (LUT) or to behave like a DRAM memory array.

9. The accelerator controller according to claim 1, wherein the identified accelerator logic is loaded in the at least one DRAM array using load and store commands.

10. An accelerator controller, comprising:
a detector to detect runtime features of an application or a virtual machine, the runtime features being based on at least one of a predefined identification of the application or the virtual machine, a function utilization, a central processing utilization, a memory utilization, and a latency associated with the application or the virtual machine; and
a loader to load an accelerator logic corresponding to the detected runtime features into at least one dynamic random access memory (DRAM) array, the at least one DRAM array being selectively reconfigurable to behave like a look-up table (LUT) based on the accelerator logic.

11. The accelerator controller according to claim 10, wherein the detector further identifies an accelerator logic associated with the application or the virtual machine corresponding to the detected runtime features.

12. The accelerator controller according to claim 10, wherein the at least one DRAM array is in a cache-coherent address space of an operating system environment.

13. The accelerator logic according to claim 10, wherein the accelerator logic comprises a look-up table (LUT).

14. The accelerator logic according to claim 10, wherein the DRAM array is part of a Dual In-line Memory Module (DIMM).

15. The accelerator logic according to claim 14, wherein the DIMM further comprises at least one DRAM array that is not selectively reconfigurable to behave like a look-up table (LUT) or to behave like a DRAM memory array.

16. A method, comprising:
detecting runtime features of an application or a virtual machine running in an operating system environment;

identifying an accelerator logic corresponding to the detected runtime features; and loading the identified accelerator logic into at least one dynamic random access memory (DRAM) sub-array using load and store commands.

17. The method according to claim 16, wherein the at least one DRAM sub-array is selectively reconfigurable to behave like a look-up table (LUT), wherein the at least one DRAM sub-array is configured to behave like an LUT, wherein the at least one DRAM sub-array is in a cache-coherent address space of the operating system environment, wherein the at least one DRAM sub-array is part of a Dual In-line Memory Module (DIMM), and wherein the detected the runtime features are based on at least one of a predefined identification of the application or the virtual machine, a function utilization, a central processing utilization, a memory utilization, a latency associated with the application or the virtual machine.

18. The method of claim 16, wherein the accelerator logic comprises a look-up table (LUT).

19. The method of claim 16, wherein the identified accelerator logic is loaded in the at least one DRAM sub-array by an acceleration controller.

20. The method of claim 16, wherein the identified accelerator logic is loaded into the at least one DRAM by the application or by the virtual machine.

\* \* \* \* \*